United States Patent [19]

Cliff

[11] Patent Number: 4,809,734
[45] Date of Patent: Mar. 7, 1989

[54] CONDENSATE-COLLECTING CEILING FOR ELEVATED WATER TOWER FACILITY

[76] Inventor: John O. Cliff, 211 Deerfield La., Franklin, Tenn. 37064

[21] Appl. No.: 250,083

[22] Filed: Sep. 28, 1988

[51] Int. Cl.⁴ .......................... E03B 11/00; E03B 9/00
[52] U.S. Cl. ..................................... 137/312; 137/357; 137/373; 220/219; 222/108
[58] Field of Search ................. 34/93; 126/426, 450; 137/312, 313, 357, 373; 203/DIG. 1; 220/1 B, 1 C, 219; 222/108; 261/108, DIG. 85; 62/150, 272, 285, 286, 290

[56] References Cited

U.S. PATENT DOCUMENTS

| 4,437 | 6/1871 | Brainard | 62/290 |
| 2,008,203 | 7/1935 | Daemicke | 62/290 |
| 2,152,691 | 4/1939 | Harbers | 62/286 |
| 2,591,862 | 4/1952 | Pedigo | 62/290 |
| 2,728,204 | 12/1955 | Harbers | 62/286 |
| 3,304,696 | 2/1967 | Mc Kenna | 62/290 |
| 3,337,418 | 8/1967 | Halacy, Jr. | 137/312 |
| 4,313,457 | 2/1982 | Cliff | 137/312 |
| 4,450,855 | 5/1984 | Hills | 137/312 |

Primary Examiner—George L. Walton
Attorney, Agent, or Firm—Abe Hatcher

[57] ABSTRACT

A condensate-collecting ceiling for water tower facilities and the like is made up of a plurality of supporting members such as rods, tubes, pipes or the like which extend from a central locus or axis such as a tension ring or riser pipe to a periphal wall and have a waterproof flexible membrane draped thereover to form valleys or channels therebetween for draining condensate therefrom into central or peripheral drain pipes.

16 Claims, 2 Drawing Sheets

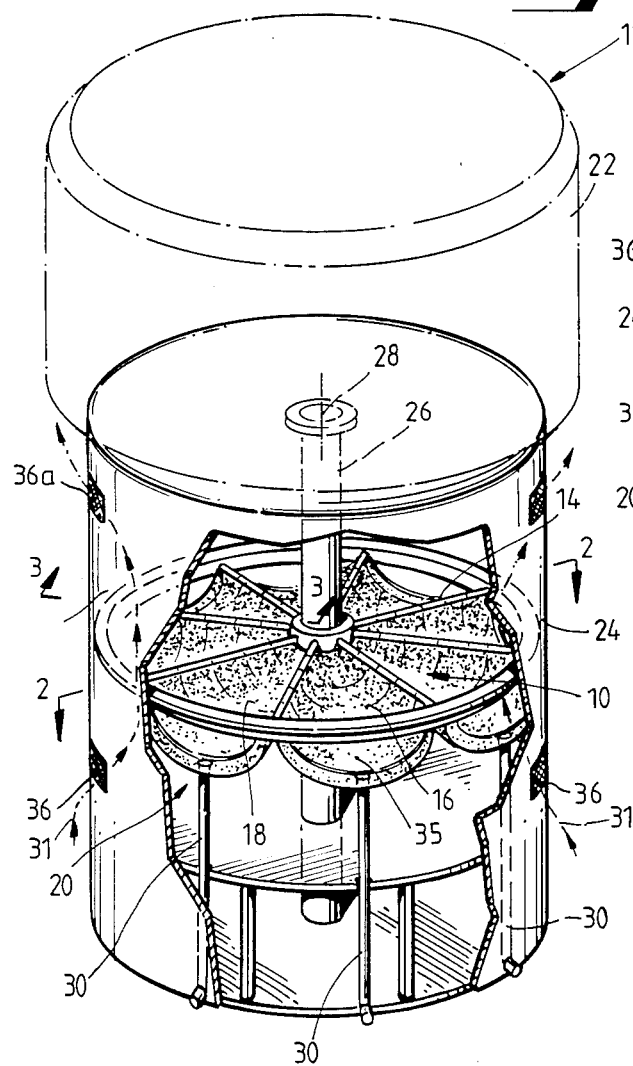
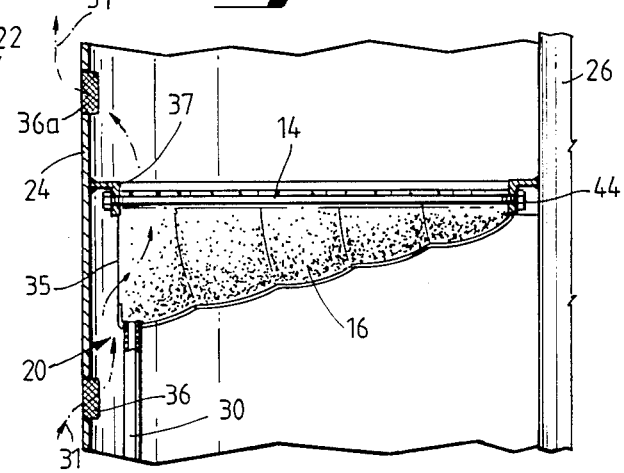
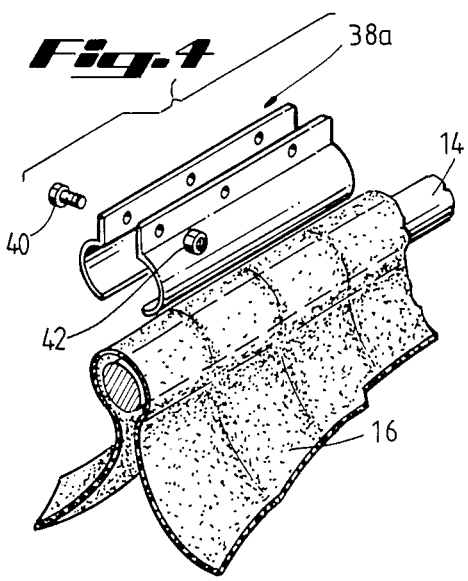
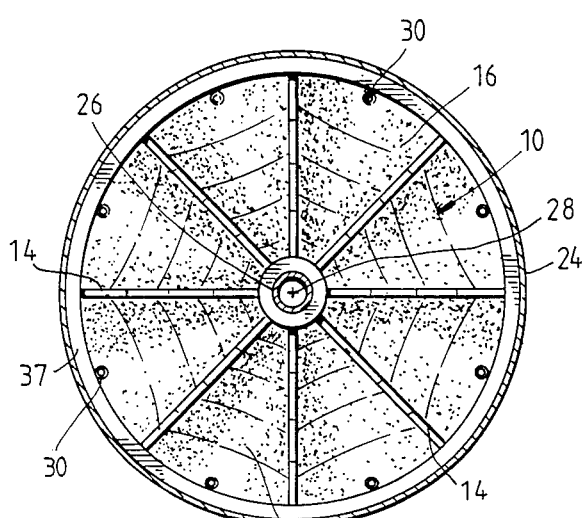
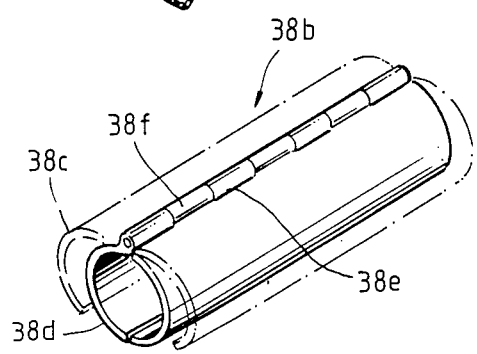

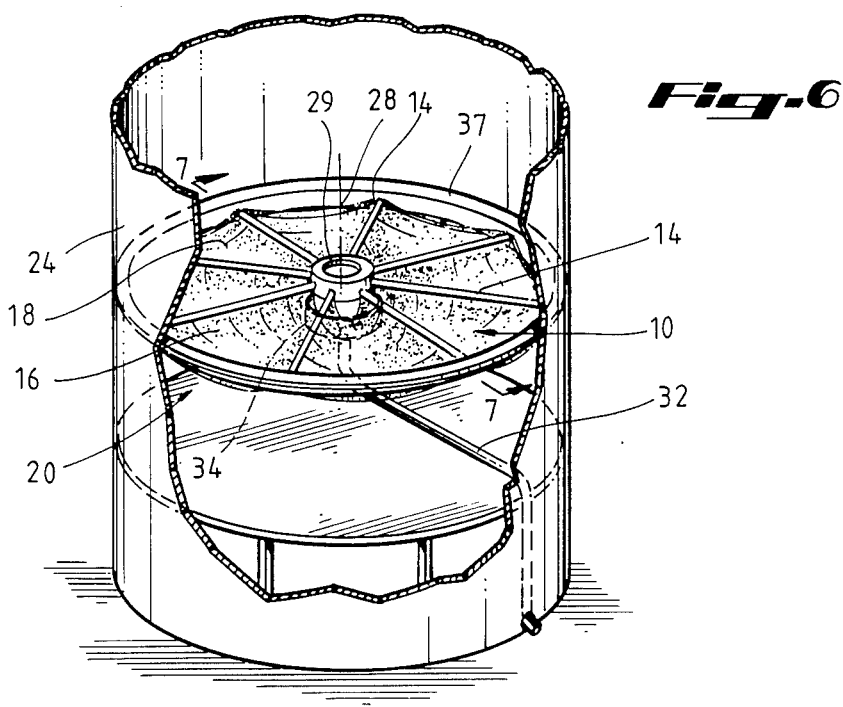
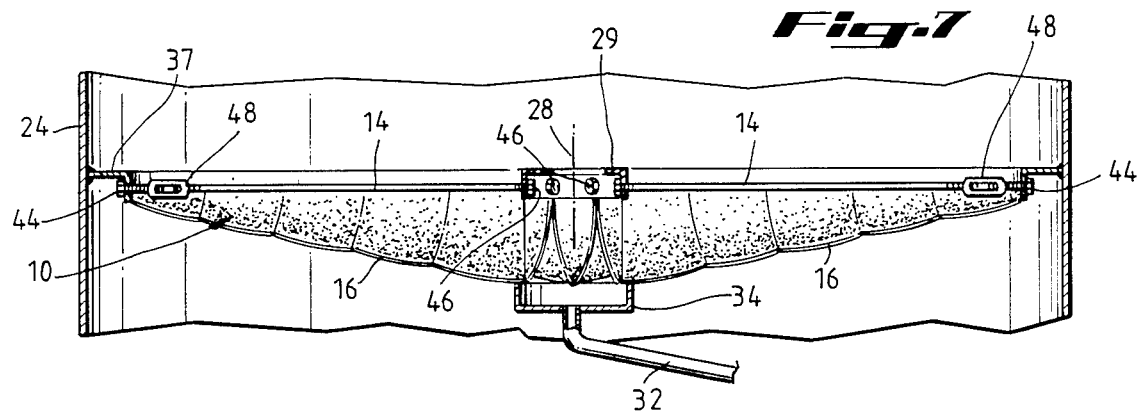
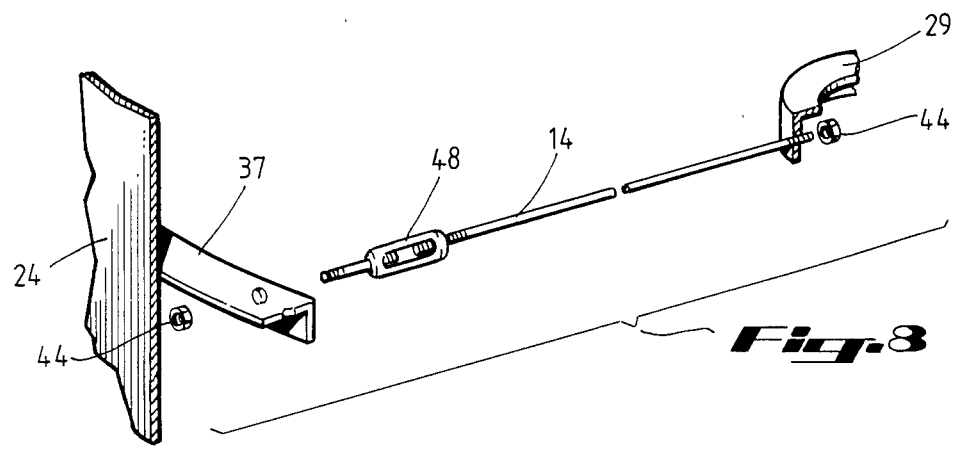

CONDENSATE-COLLECTING CEILING FOR ELEVATED WATER TOWER FACILITY

BACKGROUND OF THE INVENTION

1. Field of the Invention

This invention relates to a condensate-collecting ceiling for an elevated water tower facility or the like. More particularly, it relates to a ventilated supported ceiling.

2. Description of the Prior Art

In my U.S. Pat. No. 4,313,457 I disclose a removable condensate collector for elevated water storage facilities and the like comprising a membrane attached to walls of such facilities so as to prevent condensate from falling onto lower portions. U.S. Pat. No. 4,450,855 of Hills discloses a similar condensate collector removably attached to a riser and positioned between the underside of the water tower and the bottom of the facility. While such membranous condensate collectors as those of these two patents do successfully collect condensate, several problems have been encountered with respect to the use thereof, among them being their difficulty of installation, particularly in one piece, lack of the desired amount of strength, that is an inherent weakness, inadequate ventilation because of lack of proper airflow from the ceiling to above, membrane tearing, plugging of drains, insufficient drainage capacity and prohibitive, non-economical cost.

SUMMARY OF THE INVENTION

After extended investigation I have found that all of these and other rather extensive weaknesses with respect to attempted long-time use of such prior art devices may be substantially eliminated by providing a plurality of supporting members, for example, rods, cables, piping or the like with membrane draped thereover, the supporting members extending outward from a center or central locus, for example, the axis of a building having an upper portion from which water may condense into a lower working area portion, and adapted to be attached to a peripheral wall. The central axis or locus may be a riser pipe of an elevated water tower facility such as those of the aforementioned U.S. Pat. Nos. 4,313,457 and 4,450,855 or a tension ring with supporting members extending outward therefrom toward a peripheral wall like spokes of a wheel from its hub to its rim.

The membrane, flexible, waterproof and preferably of light-gauge metal or alloy, treated fabric, plastic or the like, is draped over the supporting members so as to form valleys, channels or valley-like segments between said members lower at midlines between said members than at edges thereof along the lengths of said members. When the condensate-collecting ceiling of the invention is used in an elevated water storage facility or the like, the membrane may be pulled tight or taut at the central axis or locus such as a riser pipe so as to drain condensate toward a peripheral wall and pipes or pulled tight or taut at its peripheral end toward the wall so as to drain condensate toward the central axis and into a pan positioned under the tension ring. Wall ports below and above the condensate-collecting ceiling of the water tank storage facility or like structure in which the ceiling is used, together with open membrane ends are employed according to the invention to furnish an air path for improved ventilation.

For a better understanding of my invention, reference will now be made to the drawing which forms a part hereof and which depicts a preferred embodiment of the invention.

BRIEF DESCRIPTION OF THE DRAWING

In the drawing,

FIG. 1 is a perspective view of an elevated water tower storage facility, partially broken away to show a radial-supported ventilated condensate-collecting ceiling according to the invention.

FIG. 2 is a cross-section taken at 2—2 of FIG. 1.

FIG. 3 is a section taken at 3—3 of FIG. 1.

FIG. 4 is an enlargement showing a partial or cut-off view of a single supporting member of the condensate-collecting ceiling of the invention such as depicted in FIGS. 1, 2 and 3 with membrane draped over said supporting member and a clamp adapted to be bolted thereover to hold said membrane thereover.

FIG. 5 is an enlargement of a portion of a representative supporting member of the condensate-collecting ceiling of the invention depicting how an over-center clamp may be used to hold membrane draped over said supporting member in place.

FIG. 6 is a perspective view of a water tower facility such as that shown in FIG. 1 broken away to show a ceiling according to the invention having a tension ring as its central axis or locus.

FIG. 7 is a cross section of a condensate-collecting ceiling of the invention taken at 7—7 of FIG. 6 and showing in detail opposing supporting members joined at opposite ends to a central tension ring and peripheral wall attachment by representative nut and turnbuckle and rod head and nut arrangements.

FIG. 8 is a perspective view in enlarged form of one of the condensate-collecting ceiling supporting members such as depicted in FIG. 7 showing means of attachment to a central tension ring and to a peripheral wall by a clip or hanger, rim or ledge arrangement in more detail.

DETAILED DESCRIPTION OF THE INVENTION

The water tower storage facility or similar upper-lower type structure (FIG. 1) made up of upper or tank portion 22 and lower or other facility portion 20 according to the invention has a condensate-collecting ceiling 10 made up generally of a plurality of supporting members 14 such as metal, steel or alloy rod, tube, flat-type, continuous drip or like members extending from a central locus or axis 28 (although the facility need not be cylindrical in form but may be of any desired shape with a peripheral square-, rectangular-, polygonal- or round-shaped or like wall 24), and having membrane 16 draped thereover so as to form segments or valleys or channels therebetween which may drain either from wall 24 toward said central locus 28, which may be a riser pipe 26 (FIGS. 1, 2 and 3) or a tension ring 29 (FIGS. 6, 7 and 8) or the like, with a collector pan 34 thereunder draining into center drain pipe 32, or from central locus or axis 28 toward wall 24 and downward through outer drain pipes 30.

The plurality of supporting members 14 may be joined at their peripheral ends to peripheral wall 24, for example, by connection to an attachment 37 such as a plurality of clips or a peripheral rim or ledge via nuts 44 and at their inner or central ends by connection to a similar attachment 37 to riser pipe 26 (FIG. 3) via nuts 44 or the heads 44 of supporting members 14, or directly to a tension ring 29 via nuts 46 or heads 46 of supporting members 14 (FIG. 7), which may have turnbuckles therearound (FIGS. 7 and 8). Membrane 16 may be held in place over each supporting member 14 by bolted clamps 38a (FIG. 4) employing bolts 40 and nuts 42 or by over-center clamps 38b (FIG. 5) shown in open position 38c and closed position 38d and made up of hinged members 38f having hinges 38e. As indicated hereinabove, supporting members may be joined to wall 24 via an attachment 37 such as individual clips or hangers at the peripheral ends of supporting members 14 or a rim extending all the way around the inside of the peripheral wall 24.

As indicated by arrows 31, ventilation is improved according to the invention by air flowing, as shown in FIGS. 1 and 2, in through a plurality of lower ports 36 around peripheral wall 24 below ceiling 10, then upward and on inward through openings 35 at the peripheral ends of valleys or channels or segments 18 of the membrane 16, and on upward and then outward through upper ports 31a around peripheral wall 24 above the level of ceiling 10.

While the invention has been described in terms of preferred embodiments, the claims appended hereto are intended to encompass all embodiments which fall within the spirit of the invention.

Having thus described my invention and certain preferred embodiments thereof, I claim:

1. In a water storage tank facility having an upper tank positioned above a lower working area, the improvement comprising as a condensate-collecting ceiling a plurality of rod-like supporting members extending from a central axis to an interior peripheral wall of said storage tank facility, said supporting members having a single and continuous flexible membrane draped cross said supporting members to form membranous segments with valleys formed therein between each of said plurality of supporting members for collecting and draining condensate into at least one drain pipe means.

2. The improvement of claim 1 wherein said central axis comprises a riser pipe.

3. The improvement of claim 2 wherein said valleys slope downward from said riser pipe toward said peripheral wall.

4. The improvement of claim 3 wherein said membranous segments are open at peripheral ends thereof and have drain pipes at peripheral ends of said valleys.

5. The improvement of claim 4 wherein said peripheral wall has a plurality of lower and upper ventilation ports therein below and above said condensate-collecting ceiling and said membranous segments have openings at peripheral ends thereof, whereby air entering said lower ports flows through said openings and outward through said upper ports.

6. The improvement of claim 1 wherein said central axis comprises a tension ring.

7. The improvement of claim 6 wherein said valleys slope downward from inside said peripheral wall toward said tension ring.

8. The improvement of claim 7 wherein said valleys have a condensate-collecting pan at said tension ring and a drain pipe extending therefrom toward said peripheral wall and then downward therefrom.

9. The improvement of claim 1 wherein said flexible membrane comprises a waterproof material selected from the group consisting of light-gauge metal, light-gauge alloy, plastic and treated fabric.

10. The improvement of claim 1 wherein said supporting members are joined to said peripheral wall by clip members.

11. The improvement of claim 1 wherein said supporting members are joined to said peripheral wall by a rim around the inside of said wall.

12. The improvement of claim 1 wherein said supporting members have turnbuckles thereover.

13. The improvement of claim 1 wherein said flexible membrane is held in place draped over said supporting members by bolted clamps.

14. The improvement of claim 1 wherein said flexible membrane is held in place over said supporting members by over-center clamps.

15. The condensate-collecting ceiling of claim 1 wherein said ceiling is positioned below an elevated water tank upper portion of an elevated water tank storage facility, said central axis comprises a tension ring positioned along an axis of said elevated water tank storage facility, and said supporting members are attached to said peripheral wall of said water tank storage facility below said elevated water tank upper portion of said elevated water tank storage facility.

16. The condensate-collecting ceiling of claim 15 wherein said ceiling is positioned below an elevated water tank upper portion of an elevated water tank storage facility, said central axis comprises a riser pipe along an axis of said elevated water tank storage facility, and said supporting members are attached to said peripheral wall of said water tank storage facility below said elevated water tank upper portion.

* * * * *